United States Patent
Wasserman et al.

(10) Patent No.: US 7,769,735 B2
(45) Date of Patent: Aug. 3, 2010

(54) SYSTEM, SERVICE, AND METHOD FOR CHARACTERIZING A BUSINESS INTELLIGENCE WORKLOAD FOR SIZING A NEW DATABASE SYSTEM HARDWARE CONFIGURATION

(75) Inventors: Theodore Jeremy Wasserman, Palo Alto, CA (US); Haider Rizvi, Richmond Hill (CA); Thomas Patrick Martin, Kingston (CA); David Benson Skillicorn, Kingston (CA)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 11/121,631

(22) Filed: May 3, 2005

(65) Prior Publication Data

US 2006/0253471 A1    Nov. 9, 2006

(51) Int. Cl.
  G06F 7/00  (2006.01)
  G06F 17/00 (2006.01)
(52) U.S. Cl. ........................ 707/705; 707/790; 702/186; 709/225; 709/226
(58) Field of Classification Search ................ 707/7, 707/10, 104, 201, 203; 709/201, 224, 155
  See application file for complete search history.

(56) References Cited

U.S. PATENT DOCUMENTS

| | | | |
|---|---|---|---|
| 5,835,755 | A | 11/1998 | Stellwagen, Jr. |
| 6,253,318 | B1 | 6/2001 | Varghese et al. |
| 6,260,068 | B1 * | 7/2001 | Zalewski et al. ............ 709/226 |
| 6,347,303 | B2 | 2/2002 | Nagai et al. |
| 6,353,884 | B1 | 3/2002 | Schmitz et al. |
| 6,411,943 | B1 | 6/2002 | Crawford |
| 6,526,504 | B1 | 2/2003 | Veazy et al. |
| 6,578,141 | B2 * | 6/2003 | Kelley et al. .................. 713/1 |
| 6,643,614 | B2 | 11/2003 | Ding et al. |
| 6,654,756 | B1 * | 11/2003 | Quernemoen et al. ....... 707/100 |
| 6,662,175 | B1 * | 12/2003 | Ghazal et al. .................. 707/2 |
| 6,691,067 | B1 * | 2/2004 | Ding et al. .................. 702/186 |
| 6,738,736 | B1 | 5/2004 | Bond |
| 6,760,684 | B1 * | 7/2004 | Yang et al. .................. 702/182 |
| 6,799,208 | B1 | 9/2004 | Sankaranarayan et al. |
| 6,823,329 | B2 * | 11/2004 | Kirk et al. ....................... 707/2 |

(Continued)

OTHER PUBLICATIONS

I. M. Graf, "Transformation between Different Levels or Workload Characterization for Capacity Planning", 1987, ACM, pp. 195-204.

(Continued)

*Primary Examiner*—Pierre M Vital
*Assistant Examiner*—Loan T Nguyen
(74) *Attorney, Agent, or Firm*—Gates & Cooper LLP

(57) ABSTRACT

A workload characterization system characterizes an exemplary business intelligence workload for use in sizing a hardware configuration required by a new database system running a similar business intelligence workload. The workload characterization system uses performance-oriented measurements to characterize an exemplary workload in terms of resource usage and performance metrics. The workload characterization system applies unsupervised data mining techniques to group individual business intelligence queries into general classes of queries based on system resource usage, providing insight into the resource demands of queries typical of a business intelligence workload. The general classes of queries are used to define an anticipated workload for a planned database system and to help identify the hardware required for the planned database system.

20 Claims, 9 Drawing Sheets

U.S. PATENT DOCUMENTS

| | | | |
|---|---|---|---|
| 6,957,209 B1 * | 10/2005 | Quernemoen | 340/310.11 |
| 6,988,102 B2 * | 1/2006 | Rossiter et al. | 707/10 |
| 7,051,098 B2 * | 5/2006 | Masters et al. | 709/224 |
| 7,076,397 B2 * | 7/2006 | Ding et al. | 702/182 |
| 7,080,051 B1 | 7/2006 | Crawford | |
| 7,096,248 B2 | 8/2006 | Masters et al. | |
| 7,171,654 B2 | 1/2007 | Werme et al. | |
| 7,181,743 B2 | 2/2007 | Werme et al. | |
| 7,185,192 B1 | 2/2007 | Kahn | |
| 2001/0044705 A1 * | 11/2001 | Vardi et al. | 702/186 |
| 2004/0111410 A1 | 6/2004 | Burgoon et al. | |
| 2004/0117387 A1 | 6/2004 | Civetta et al. | |
| 2005/0038833 A1 * | 2/2005 | Colrain et al. | 707/203 |
| 2005/0228875 A1 * | 10/2005 | Monitzer et al. | 709/221 |
| 2006/0074970 A1 | 4/2006 | Narayanan et al. | |
| 2006/0136370 A1 | 6/2006 | Buckler | |
| 2006/0161517 A1 * | 7/2006 | Bhattacharjee et al. | 707/2 |

OTHER PUBLICATIONS

G. B. Gibbs et al., "IBM eServer pSeries Capacity Planning: ISV Tools," availalbe at the following URL: "http://www.redbooks.ibm.com/redpapers/pdfs/redp3855.pdf," pp. 1-108. IBM, 2004.

* cited by examiner

SYSTEM, SERVICE, AND METHOD FOR CHARACTERIZING A BUSINESS INTELLIGENCE WORKLOAD FOR SIZING A NEW DATABASE SYSTEM HARDWARE CONFIGURATION

CROSS-REFERENCE TO RELATED APPLICATION

The present application is related to U.S. patent application, titled "System, Method, And Service For Automatically Determining An Initial Sizing Of A Hardware Configuration For A Database System Running A Business Intelligence Workload," Ser. No. 11/122,169, filed concurrently herewith on May 3, 2005, which is assigned to the same assignee as the present invention, and which is incorporated herein by reference.

FIELD OF THE INVENTION

The present invention generally relates to business intelligence or data warehouse systems, and more specifically to a method for characterizing the workload of a new business intelligence system that has not yet been run in a production environment. In particular, the workload is characterized in terms of resource usage and performance characteristics.

BACKGROUND OF THE INVENTION

Database systems perform a vital role in the information technology infrastructure of a business or corporation. Specialized databases for data warehousing and data analysis are becoming an important segment of the total database market. Business intelligence systems transform raw data into useful information. Common applications of business intelligence systems are, for example, fraud detection, risk analysis, market segmentation, and profitability analysis.

In a business intelligence system, data is extracted from heterogeneous operational databases and external data sources, then cleansed, transformed, and loaded into a large data warehouse or data mart storage areas. Data warehouses are subject-oriented, integrated, and time-varied collections of data used primarily for making decisions. Data marts are departmentalized subsets of the data warehouse focusing on selected subjects, rather than the entire enterprise data.

Data is stored and managed by one or more data warehouse servers that provide data access to front end tools for querying, reporting, analysis, and mining. Specialized online analytical processing (OLAP) servers may also be used to construct multidimensional views of the data, where operations on data can be performed.

Business intelligence workloads have different characteristics than the traditional transaction processing workloads used in conventional capacity planning and sizing methods. Business intelligence workloads place a greater emphasis on summarized and consolidated data as opposed to individual records. Business intelligence workloads typically use a very large size database. Queries of business intelligence workloads are heterogeneous, complex, and ad-hoc in nature, varying greatly in the amount of time required to execute the queries. These queries often touch millions of records and may perform many table joins, sorts, or aggregations. Furthermore, queries of business intelligence workloads can produce very large results sets, requiring a large amount of concurrent I/O.

Computer capacity planning is the process of analyzing and projecting an existing workload to determine the type of hardware resources needed to meet future demand and to predict when system saturation occurs. The capacity planning process can be long and challenging, depending on the size and complexity of the application, the quality and quantity of information available, as well as the approaches and tools employed. A computer capacity-sizing expert often performs computer capacity planning manually with insufficient information and using an unstructured, informal approach.

Database system sizing attempts to arrive at an initial estimate of a hardware configuration that satisfies performance demands, cost constraints, and functional requirements of a new business intelligence system. Typically, detailed information about the system and its workload are not available during the sizing process. In conventional database system sizing, a sizing expert uses published performance results of a similar workload with similar performance requirements. The sizing expert extrapolates these results to the new business intelligence system. This extrapolation is performed using informal industry guidelines ("rules of thumb") and published performance relationships between different types of hardware. The sizing expert thus obtains an initial estimate of the hardware configuration comprising the processor, disk, and memory required to meet resource demands of the expected workload and the expected size of the database.

Selecting the appropriate hardware resources can be a complicated task because of the wide variety of processor, disk, network, and memory technologies available. Further, determining the quantity of each resource needed and predicting how the different components interact under a specific workload are non-trivial tasks.

Many of the approaches and tools used for capacity planning were developed in the late-1970s and early-1980s when mainframe computers were the dominant computing platform. Mainframes were very expensive; therefore it was critical to perform detailed planning and analysis before a particular model was purchased. A variety of tools were created to help a planner with this task, including tools for performance monitoring, workload forecasting, performance simulation, and design/configuration advice.

As mainframe architectures slowly gave way to client-server, and more recently, n-tier architectures, the focus on planning was not as systematic. This may be partly attributed to financial factors; namely the declining cost and improving performance of computer hardware. The cost of a cluster of inexpensive server machines networked together became substantially less than that of a mainframe. Fixing configuration errors resulting from poor planning could cost in the thousands of dollars for n-tier architectures versus millions of dollars for mainframes. The additional cost to perform detailed planning analysis often exceeded the costs to correct configuration errors, thus complete planning studies were relatively unattractive.

The complexity of modeling performance in n-tier architectures also makes planning more difficult. Traditional methods used for mainframes are not directly transferable to n-tier architectures. In the mainframe domain, components such as processors, disks, and memory share similar designs and characteristics; however, this is not the case in n-tier environments. The proliferation of competing and sophisticated processor, disk, memory, and network technologies makes creating generic performance models very difficult.

The resource demands of modern applications are also more complex and demanding in nature than in the past, making their performance less predictable. The popularity and commercialization of the Internet and World Wide Web fostered the demand for newer and richer data such as graphics, audio, video, and XML. Whereas this data was once stored for archival purposes only, companies have now started analyzing it with specialized data analysis applications to discover new information about their business and customers. This places additional resource burdens on systems in addition to the traditional transaction processing workloads being handled.

Time and business pressures also make detailed capacity planning studies infeasible. In today's e-business on demand environment, customers demand and expect answers in a timely fashion. A day or week is often a critical amount of time for completing a hardware sale. This implies that any planning analysis needs to be performed quickly while maintaining a high degree of accuracy.

The result of the sizing process is an initial estimate of the hardware configuration (processor, disk, and memory) needed to meet the resource demands of the expected workload and size of database. Customers expect a cost-efficient and effective hardware solution that meets the performance requirements of their application while offering the maneuverability to accommodate future expansion. There is generally no opportunity for experts to validate their hardware recommendations because of financial and time constraints. The sizing process currently involves significant manual effort to complete.

Successful sizing of a business intelligence system requires a characterization of the anticipated workload. Workload characterization dates back to the 1970s when workloads largely comprised large transactions and batch jobs performed on mainframe computers. Techniques have evolved to accommodate some of the modern workloads encountered in current computing environments. The majority of conventional workload characterization approaches assume that detailed performance measurements from a production environment are available to build models of system performance.

One conventional workload characterization approach uses clustering analysis to construct a profile of a data warehousing workload to summarize the characteristics of the workload. The profile can be used to help a designer during logical and physical optimization. The profile can be further used to generate workloads useful for evaluating system performance in testing and benchmark settings.

Conventional techniques for workload characterization rely on a combination of structural query properties and statistical parameters to perform a clustering. The structural properties are based on the text of a query, such as the number of table joins, the number of predicates, and the type of predicates. Statistical parameters comprise quantitative values in the catalog tables of a database system, such as table size, size, the type of indexes on a table, and the skew of data values in the table. Although these techniques have proven to be useful, it would be desirable to present additional improvements. Currently, there is no known conventional technique for workload characterization that makes use of performance-oriented measurements, that are subsequently used to aid in the sizing of a new database system running a business intelligence workload.

Conventional techniques for selecting an initial size of a hardware configuration for a database system are manually performed by sizing experts. Furthermore, conventional techniques assume that little system environment information or performance measurements are available, thus a sizing expert relies on extrapolations from similar workloads, personal experience, industry benchmarks, informal industry guidelines, and hardware performance guidelines to determine the type and quantity of required resources. Currently, there is no available method for characterizing an anticipated workload based on performance-oriented characterization of a similar workload.

What is therefore needed is a system, a service, a computer program product, and an associated method for characterizing a business intelligence workload to aid in sizing the hardware configuration of a new database system. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for characterizing the workload of a business intelligence system. This characterization is used to facilitate the process of sizing a hardware configuration required by a new database system. The present system is a workload characterization analysis that can be used as a basis for describing business intelligence workloads. The present system applies unsupervised data mining techniques to group individual business intelligence queries into general classes of queries based on system resource usage. The workload characterization generated by the present system provides insight into the resource demands of classes of queries typically found in a business intelligence workload. The workload characterization can be further exploited in, for example, workload management or meeting quality of service requirements.

The present system utilizes performance-oriented measurements to characterize a workload. The present system further employs clustering algorithms known for revealing underlying or hidden dimensions in data. The ability to reveal underlying dimensions is particularly useful because of the many different interactions occurring between software and hardware during query processing that affect system performance.

Business intelligence applications and their workloads vary depending on the type of application, the target industry, and the nature of business questions being asked. The present system uses an exemplary workload, specifically, the TPC-H benchmark, as a representative workload for characterizing a business intelligence system. The TPC-H benchmark comprises 22 ad-hoc queries that answer questions representative of any industry that manages, sells, or distributes a produce worldwide, such as a car rental business, a food distribution business, a parts business, a supplier, etc.

It is difficult to build an accurate model if a workload is considered as a single entity (i.e., an average of the heterogeneous queries comprising it). A workload model also becomes too complex if each individual query is considered, in effect, as an independent workload. The present system achieves a balanced and practical solution by partitioning a collection of queries into a few general classes of queries, based on the system resource usage by the queries. Each class comprises queries that are similar to each other based on resource usage and other relevant characteristics.

The present system identifies the basic components of a workload, chooses characterizing parameters for the workload, collects data for the workload, normalizes the collected data, partitions the workload into classes, and identifies interesting characteristics of the partitioned classes.

The present system groups or clusters the queries of the exemplary workload into broad categories, each with different characteristics. One group describes trivial types of queries, with short run-times, a small number of tables being joined, and exhibiting high CPU utilization. Another group represents simple queries that are I/O-bound and have a small number of tables being joined. A further group represents moderate-complexity queries with moderately high response times, and moderate CPU and I/O usage. Yet another group represents complex queries that are long-running, have a large number of tables being joined and exhibit high sequential and random I/O usage.

The present invention may be embodied in a utility program such as a workload characterization utility program. The present invention provides means for the user to provide the set of data to be characterized by the present system. The present invention further provides means to help the user to characterize a workload or set of data from descriptions of groups or clusters generated. A user specifies a benchmark, workload, or set of data and then invokes the workload characterization utility program. The user then describes the benchmark, workload, or set of data in terms of the clusters generated by the workload characterization utility program.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
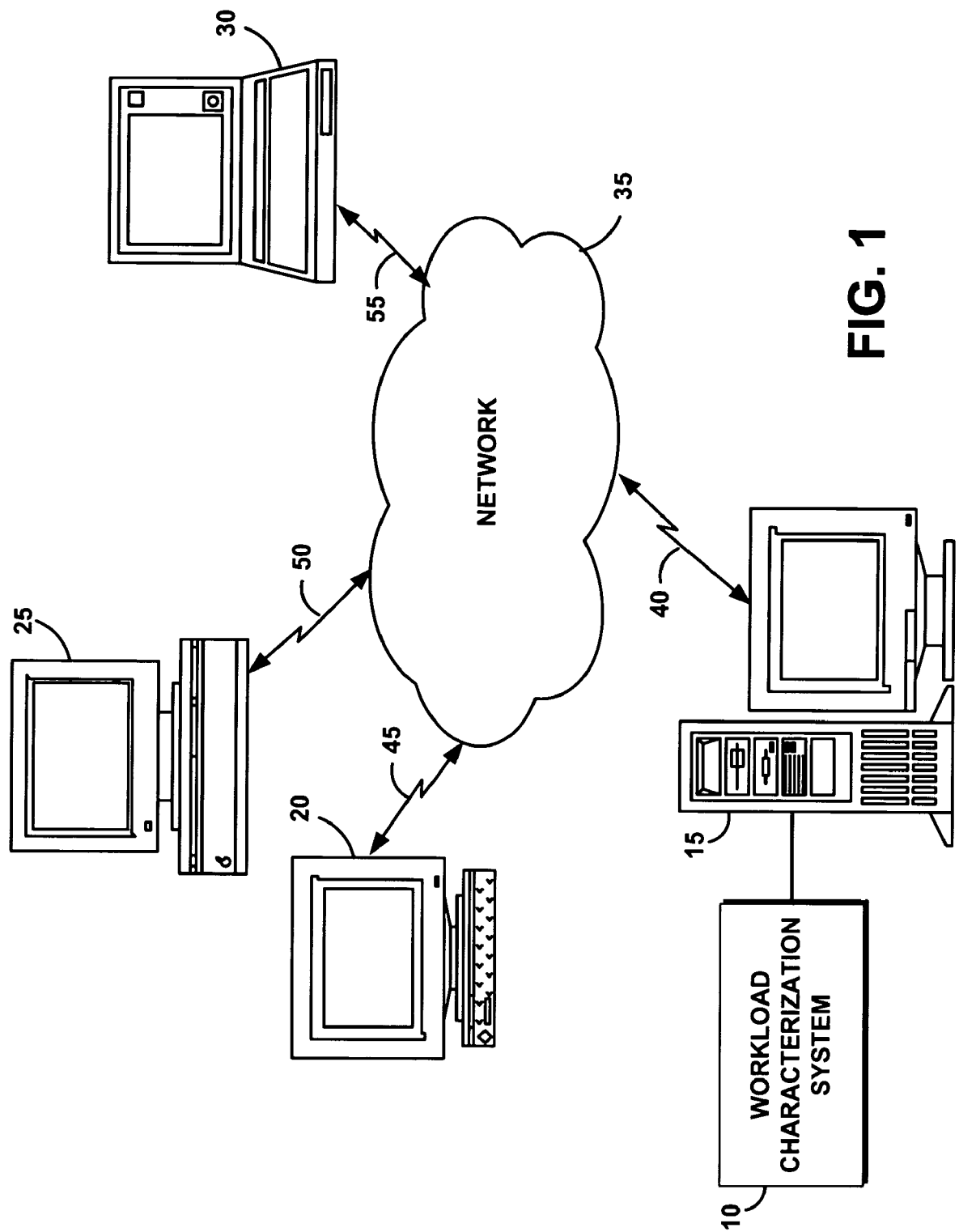
FIG. 1 is a schematic illustration of an exemplary operating environment in which a workload characterization system of the present invention can be used.

FIG. 1 portrays an exemplary overall environment in which a system and associated method for automatically selecting an initial sizing of a hardware configuration for a business intelligence workload according to the present invention may be used. System 10 comprises a software programming code or a computer program product that is typically embedded within, or installed on a host server 15. Alternatively, system 10 can be saved on a suitable storage medium such as a diskette, a CD, a hard drive, or similar devices.

Clients, such as remote Internet users, are represented by a variety of computers such as computers 20, 25, 30, and can access the host server 15 through a network 35. Computers 20, 25, 30 each comprise software that allows the user to interface securely with the host server 15. The host server 15 is connected to network 35 via a communications link 40 such as a telephone, cable, or satellite link. Computers 20, 25, 30, can be connected to network 35 via communications links 45, 50, 55, respectively. While system 10 is described in terms of network 35, computers 20, 25, 30 may also access system 10 locally rather than remotely. Computers 20, 25, 30 may access system 10 either manually, or automatically through the use of an application.

A client provides input to a workload characterization system 10 for a business intelligence system. System 10 facilitates the process of determining the broad characterizations that may be use to describe the workload composition of the new business intelligence system.

Figure 2:
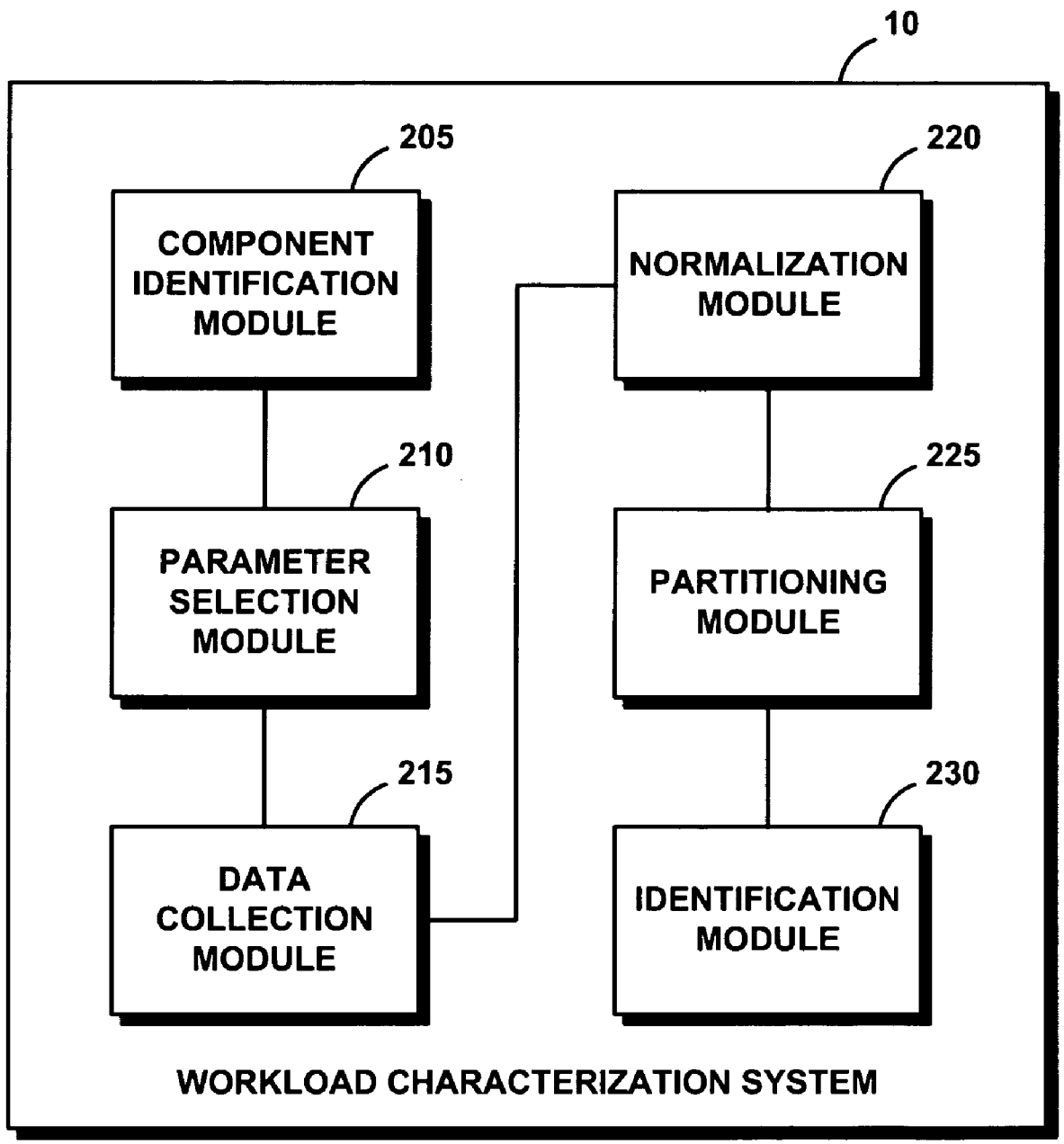
FIG. 2 is a block diagram of the high-level architecture of the workload characterization system of FIG. 1.

FIG. 2 illustrates a high-level hierarchy of system 10. System 10 comprises a component identification module 205, a parameter selection module 210, a data collection module 215, a normalization module 220, a partitioning module 225, and an identification module 230.

Figure 3:
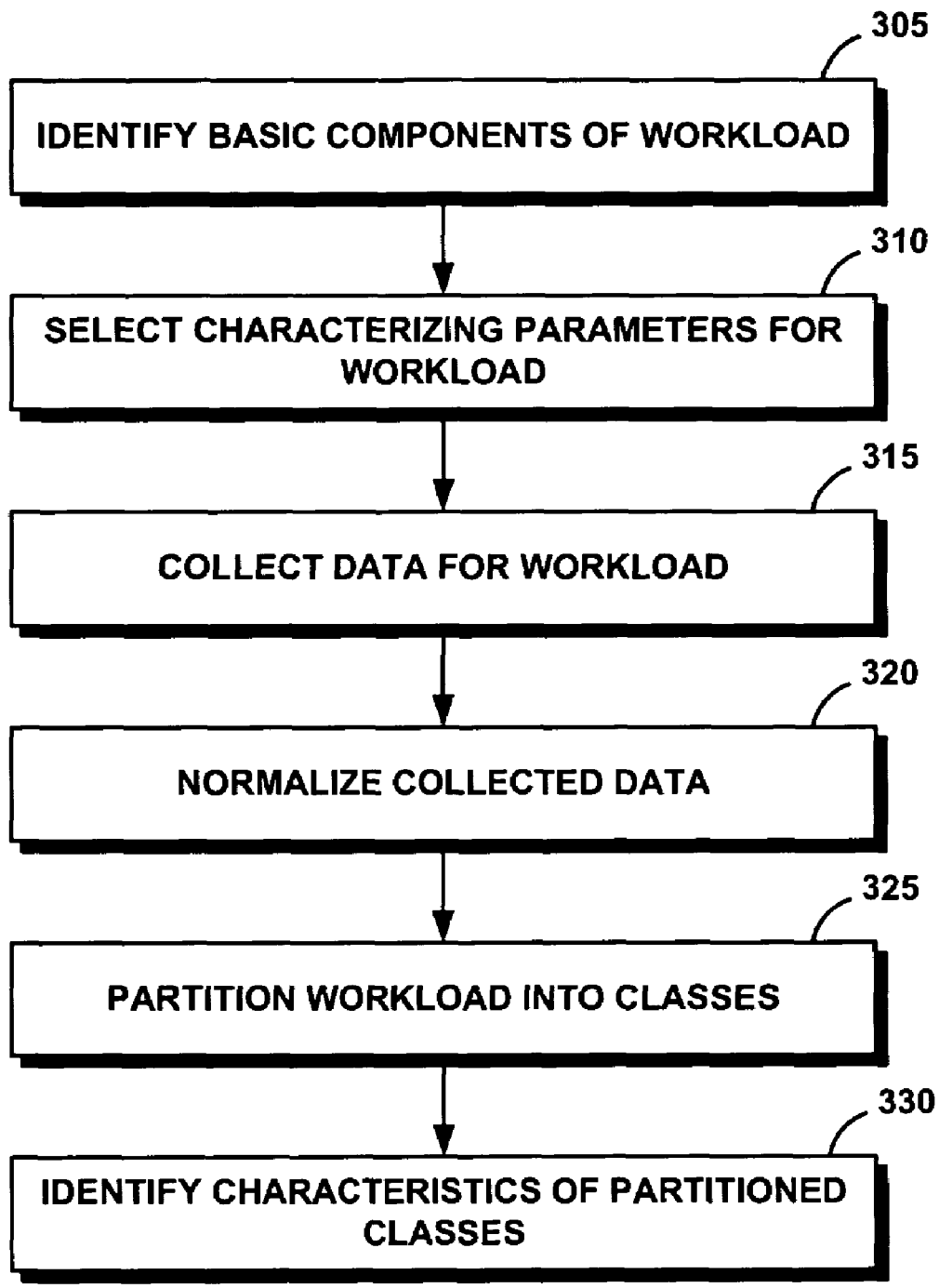
FIG. 3 is a process flow chart illustrating a method of operation of the workload characterization system of FIGS. 1 and 2.

FIG. 3 illustrates a method 300 of system 10 in constructing a workload model. The component identification module 205 identifies the basic components of a workload (step 305). The parameter selection module 210 selects characterizing parameters for the workload (step 310). The data collection module 215 collects data for the workload (step 315). The normalization module 220 normalizes the collected data (step 320). The partitioning module 225 partitions the workload into classes (step 325) (further referenced herein as groups or clusters). The identification module 230 identifies characteristics of the partitioned classes (step 330).

System 10 uses a workload, such as the 22 queries of the TPC-H benchmark, as a representative business intelligence workload in order to identify the basic components of a typical business intelligence workload and to simulate the business intelligence environment (step 305). While the present system is described in terms of a benchmark like the TPC-H benchmark, it should be clear that any standard workload may be used. For example, several workloads may be operating concurrently. The selected benchmark simulates the type of resource activity commonly found in business intelligence system implementations.

Care is taken to ensure that each benchmarked system is balanced. A system is considered balanced when all of the resources of the system are operating in concert to allow an optimal amount of workload through the system to meet specific objectives. System 10 assumes that the performance of a balanced system is relative to the available quantity of system resources. For example, if the quantity of system resources is increased in a balanced fashion, system performance increases. The difference in performance between benchmark configurations is typically relative. That is, the performance of a particular query in a benchmark run, is generally relative to the performance of other queries in the same benchmark run.

The parameter selection module 210 selects performance-oriented parameters to analyze for each individual query (step 310). Exemplary performance-oriented parameters comprise, for example, response time, average processor (CPU) utilization, sequential Input/Output (I/O) throughput rate, and the rate of random I/O operations per second. The response time is the amount of time (in seconds) that elapses from query submission to result set return. The average processor (CPU) utilization is the average utilization of the processor(s) over the duration of query execution.

The average processor utilization comprises the utilization of user processes, as opposed to the operating system kernel or privileged threads/processes. The sequential Input/Output (I/O) throughput rate is the average rate that data is sequentially read from disk over the duration of query execution, measured in megabytes per second (MB/second). The random I/O operations per second (IOPS) rate is the average rate of random I/O requests processed per time window over the duration of query execution. In one embodiment, system 10 monitors other types of parameters, such as memory and network utilization.

System 10 accepts workload data arising from different system configurations comprising varied computer models, hardware parts, operating systems, and database scales. The data collection module 215 accepts raw performance data obtained from the different systems. This data is typically obtained using standard operating system performance monitoring tools (step 315). These monitoring tools are configured to sample the desired parameters at a predetermined interval, such as five-second intervals. Representative parameter values for each query are determined by averaging the raw data samples collected over a predetermined elapsed time for each respective parameter. Table 1 illustrates an exemplary sample of collected performance data.

TABLE 1

Averaged parameter values for data from a benchmark power run.

| System Number | Query Number | Response Time (seconds) | Average CPU Utilization (%) | Average MB/second | Average IOPS |
|---|---|---|---|---|---|
| A | 1 | 251 | 72 | 870.4 | 2508 |
| A | 2 | 50 | 25 | 269.3 | 6510 |
| A | 3 | 64 | 61 | 435.8 | 1342 |
| ... | ... | ... | ... | ... | ... |

The choice of units of measurement can affect the characterization analysis of system 10. For instance, expressing temporal data in seconds versus hours can produce a different result, depending on the type of analysis technique used. To avoid dependence on the choice of units, the normalization module 220 standardizes the collected data through normalization (step 320). To normalize the data, the normalization module 220 calculates a z-score of each measured parameter variable. A z-score transforms the dataset of measured parameters into a dataset with a mean of 0 and standard deviation of 1. The z-score of a parameter value can be calculated as follows:

$$z-\text{score} = \frac{\text{measured value} - \text{mean value}}{\text{standard deviation}}$$

The normalized data resembles a format similar to that shown in Table 2.

TABLE 2

Normalized parameter values for data for a benchmark power run illustrated in Table 1.

| System Number | Query Number | Normalized Response Time | Normalized Average CPU Utilization | Normalized Average MB/second | Normalized Average IOPS |
|---|---|---|---|---|---|
| A | 1 | 0.308699 | 0.686123 | −0.719756 | 0.816672 |
| A | 2 | −0.966750 | −3.625209 | 2.033492 | −1.287711 |
| A | 3 | −0.918418 | −0.434621 | −1.247433 | −0.642141 |
| ... | ... | ... | ... | ... | ... |

Once the data for each benchmark is normalized, the normalization module 220 combines all the data into a single matrix (table), which is used by the partitioning module 225 to partition the workload into classes.

The partitioning module 225 employs clustering techniques to partition the workload (step 325). Clustering is the process of grouping data into classes or clusters so that objects within a cluster are similar to each other, but are dissimilar to objects in other clusters. The partitioning module 225 utilizes singular value decomposition (SVD) and semi-discrete decomposition (SDD) to partition the workload into classes. When used in combination with each other, SVD positions the dataset of system 10 in a graphical space while SDD provides further classification of the dataset within that graphical space. Singular value decomposition and semi-discrete decomposition are examples of unsupervised data mining techniques. Unsupervised data mining discovers structured information in a dataset without prior knowledge or user-provided hints as to what the structure might looks like.

Singular value decomposition and semi-discrete decomposition view the dataset as a matrix and decompose a dataset matrix into a product of three new matrices. However, the structure and meaning of each of the new matrices is different in each technique.

SVD decomposes a dataset matrix A into the product of matrices, U, S, and V such that:

$$A = U S V^T$$

where U is n×m, S is a diagonal matrix of non-increasing non-negative values, and V is m×m. In effect, SVD transforms an m-dimensional space into a new m-dimensional space. The new m-dimensional space comprises axes that are orthonormal and ordered so that a maximum amount of variation is contained in the first m axes in the new space. The entries in the matrix S are scaling factors indicating the relative importance of each axis. Geometrically, the rows of U represent coordinates of the corresponding rows of A in a space spanned by the columns of V, while the rows of V represent the coordinates of the corresponding columns of A. A common practice in SVD is to truncate the representation to k dimensions, where k is some arbitrary constant, to make analysis more manageable. Since SVD concentrates as much variation as possible into the first few dimensions, truncating is feasible because the least possible information is discarded.

SDD is similar to SVD in that it decomposes a dataset matrix A into a product of three matrices, such that:

$$A = X D Y$$

However, the matrices of the SDD have a different form and meaning than SVD. X is an n×k matrix, D is a k×k diagonal matrix, and Y is a k×m matrix, where k is an arbitrary constant. The entries of X and Y are from the set {−1, 0, +1}. Objects are divided based on their value in an initial column of X (−1, 0, +1). Objects can be further subdivided according to their values in the subsequent columns of X. In effect, SDD discovers rectilinearly aligned regions of the matrix of similar (positive and negative) magnitude. These regions/partitions determine which objects are related.

SVD and SDD can be jointly applied to the dataset of system 10 by using both decompositions, truncating the SVD at k=3, plotting the points corresponding to queries, and labeling each point according to its location in the top few levels of the SDD decomposition.

In one embodiment, additional attributes are added to each row of the dataset of Table 1. One such attribute is, for example, the size of the largest n-way table join in each query. Table joins are a prominent characteristic of business intelligence queries and are processing-intensive. The addition of this attribute results in a tighter clustering of data points due to a closer relation between queries with the same label. For example, the data values for all the query 1s should appear closer together in the clustering, since the size of the largest n-way table join is the same for query 1, regardless of the system it is run on.

Figure 4:
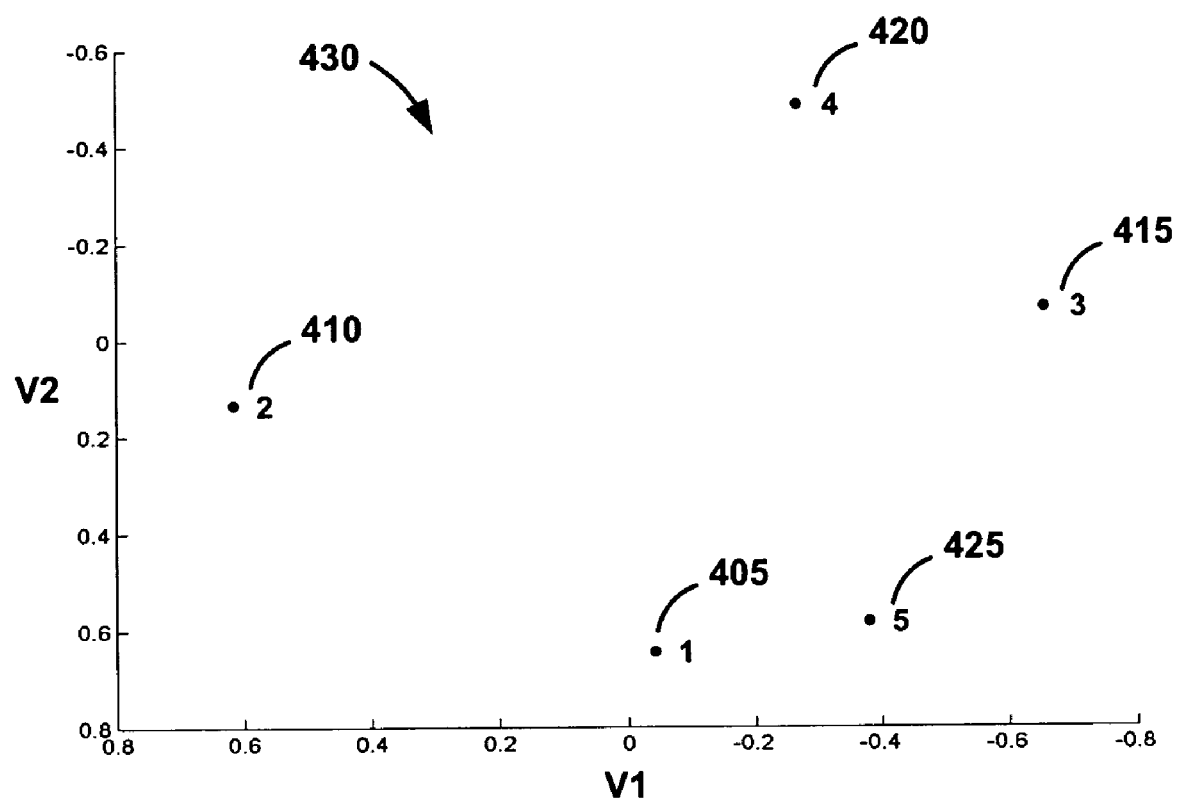
FIG. 4 is a graph illustrating a classification of selected attributes performed by the workload characterization system of FIGS. 1 and 2.

FIG. 4 is a graph of the results of a joint SVD and SDD classification on the set of selected attributes, illustrating the relative contribution of each selected attribute to the analysis. As shown in FIG. 4, the selected attributes are response time, average CPU utilization, sequential input/output throughput rate, random I/O operations per second rate, and the size of the largest n-way table join. Since the points 430 corresponding to the selected attributes are distributed relatively uniformly in a geometric space of the graph of FIG. 4, each attribute is significant and adds useful information to the analysis of system 10.

Figure 5:
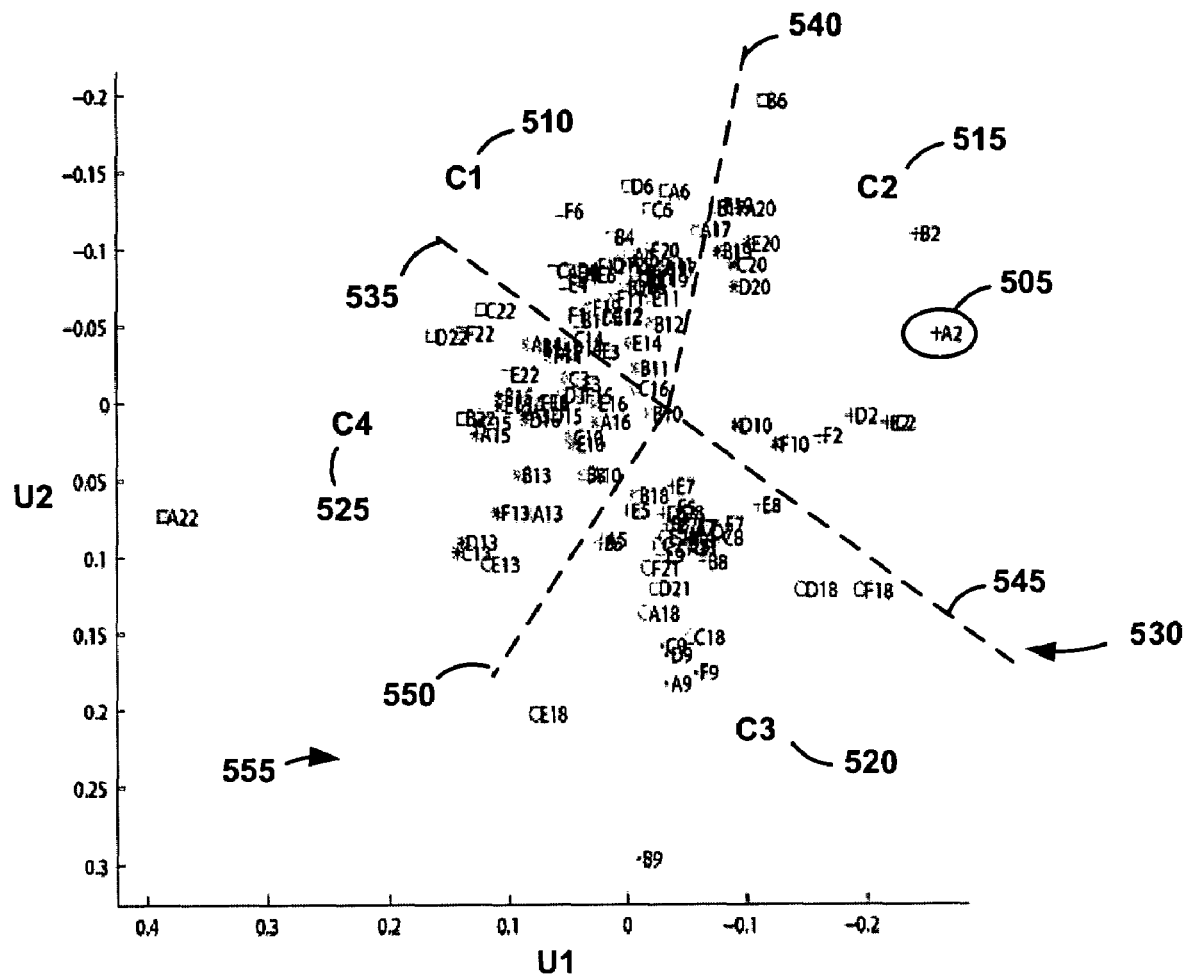
FIG. 5 is a graph illustrating a characterization of an exemplary workload performed by the workload characterization system of FIGS. 1 and 2.

FIG. 5 illustrates the results of a joint SVD and SDD classification of the dataset using an exemplary workload consisting of the set of 22 queries from the TPC-H benchmark run on an exemplary set of system configurations: A, B, C, D, and E. Each benchmark query for each system configuration is plotted in FIG. 5 as illustrated by point A2, 505 labeled A2 for query 2 run on system A. Four clusters of queries appear to be present in this dataset: cluster 1, 510, cluster 2, 515, cluster 3, 520, and cluster 4, 525 (collectively referenced as clusters 530). Approximate cluster boundaries are indicated with dashed lines as boundary 535, boundary 540, boundary 545, and boundary 550 (collectively referenced as boundaries 555).

In the example of FIG. 5, system 10 determines that cluster 1, 510, comprises the following queries in the exemplary workload: Q11, Q14, Q5, Q12, Q8, Q7, Q1, Q3, Q4, and Q10. System 10 determines cluster 2, 515, comprises the following queries in the exemplary workload: Q2, Q20, and Q17 (queries Q19 and Q6 are borderline to cluster 2, 515). System 10 further determines that cluster 3, 520, comprises the following queries in the exemplary workload: Q9, Q18, Q21. System 10 determines that cluster 4, 525, comprises the following queries in the exemplary benchmark: Q13, Q22, Q15, Q16.

As illustrated in FIG. 5, queries in the exemplary workload appear to scale well across different system architectures and benchmark scales represented by the selected system configurations. For instance, points corresponding to query 1 appear close together in cluster 1, 510. The same is true for most of the other queries.

In general, cluster 2, 515, represents fairly simple queries that are IO-bound in nature and have a small number of tables being joined. Cluster 3, 520, represents long-running, large and complex queries with a large number of tables being joined (for example, greater than 5 joins). Queries in cluster 3, 520, further exhibit high sequential and random I/O usage. Cluster 4, 525, represents short-running trivial queries with a varying amount of tables being joined (for example, 3 to 8 table joins). Cluster 1, 510, represents medium-running queries with a smaller number of tables being joined (for example, 5 or fewer joins) and exhibiting high CPU utilization. Cluster 1, 510, is considered less interesting since the data points in cluster 1, 510, are those closest to the origin in the graph of data points shown in FIGS. 4 and 5.

Figure 6:
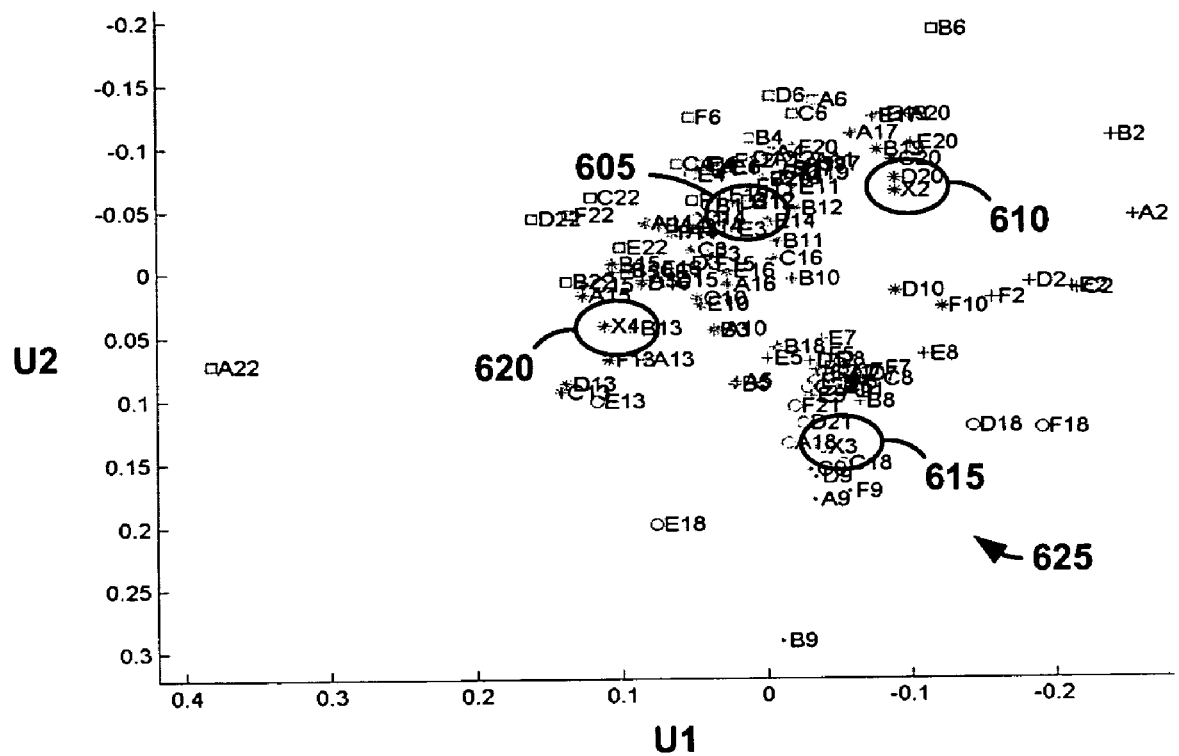
FIG. 6 is a graph illustrating a classification of artificially generated points in addition to all the points in the graph of FIG. 5, wherein artificial points are generated based on an intuitive meaning of the different clusters arising from the clustering shown in the graph of FIG. 5.

Artificially-generated data points are used to further lend support to the meaning of the clusters 530. FIG. 6 illustrates the data points of FIG. 5 with the addition of four artificial points, X1, 605, X2, 610, X3, 615, and X4, 620 (collectively referenced as artificial points 625). Characteristics of the artificial points 625 are selected to correspond to a query that performs according to each of the cluster characterizations described above. Each of the artificial points 625 is in close proximity to the center of its respective cluster, lending support to the interpretation of cluster semantics made by system 10.

Figure 7:
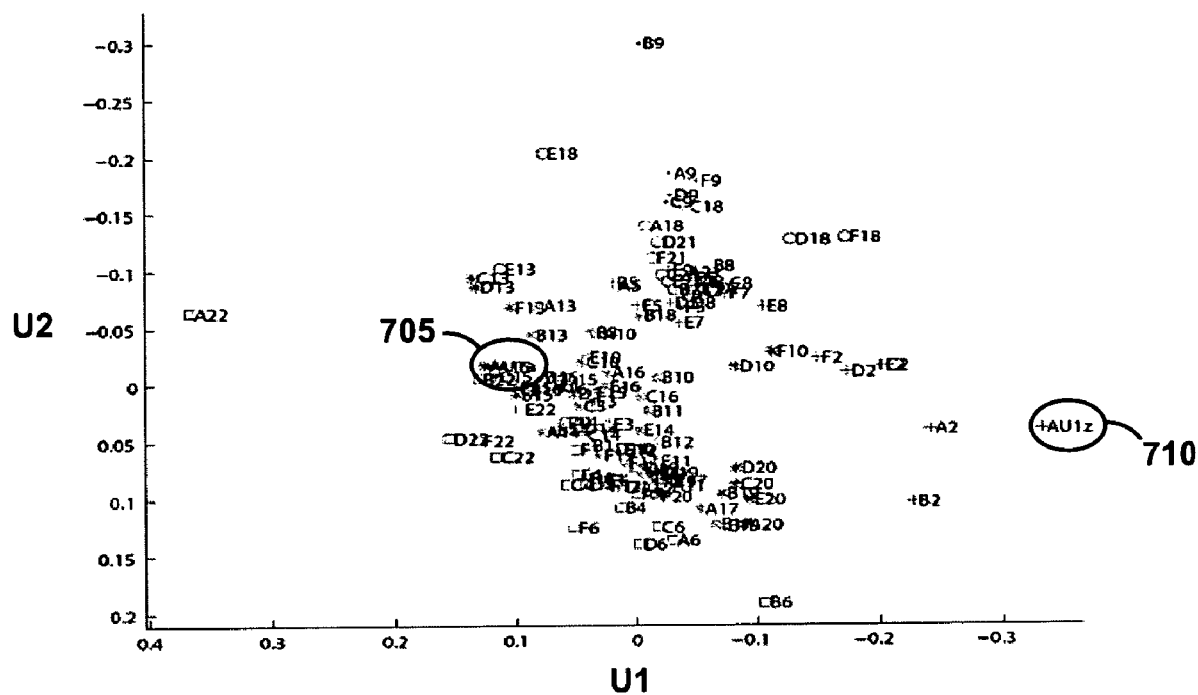
FIG. 7 is a graph illustrating a classification of artificially generated points in addition to all the points in the graph of FIG. 5, wherein the artificial points are generated based on an intuitive meaning of the new dimension $u_1$ in the characterization by the workload characterization system of FIGS. 1 and 2 for the exemplary workload.

To further illustrate the validity and appropriateness of the clustering performed by system 10, another set of artificially-generated query data points is created to represent extreme examples of each dimension. If the SVD transformation of these artificial query data points places them at extreme ends of one of the transformed dimensions, further evidence is provided to interpret the meaning of the new dimension. FIG. 7 is the graph of FIG. 5 with artificial points, AU1a, 705, and AU1z, 710, added to help interpret the meaning of the variance in the U1 dimension. Both points appear at the extreme ends of the U1 dimension, lending weight to the belief that the U1 dimension distinguishes between queries that are CPU-bound versus those that are IO-bound.

Figure 8:
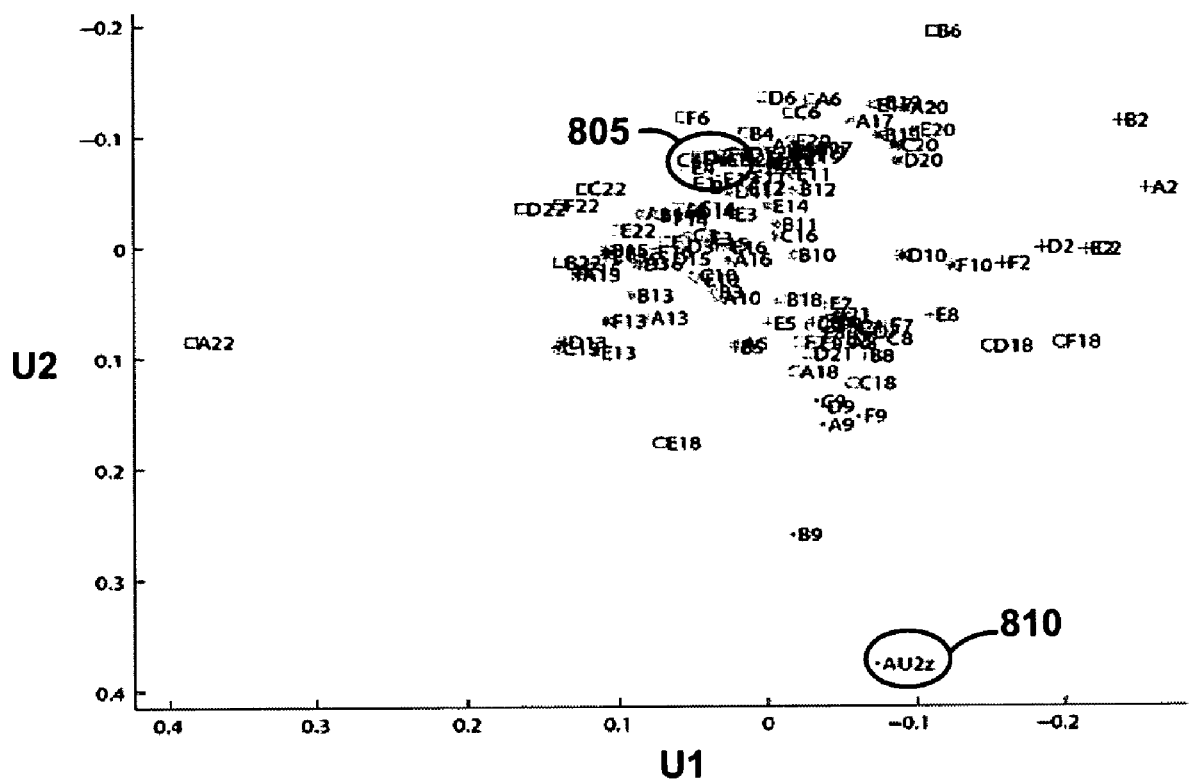
FIG. 8 is a graph illustrating a classification of artificially generated points in addition to all the points in the graph of FIG. 5, wherein the artificial points are generated based on an intuitive meaning of the new dimension $u_2$ in the characterization by the workload characterization system of FIGS. 1 and 2 for the exemplary workload.

FIG. 8 illustrates a similar analysis for dimension U2; FIG. 8 is the graph of FIG. 5 with artificial points, AU2a, 805, and AU2z, 810, added to help interpret the meaning of the variance in the U2 dimension. Both points appear at the extreme ends of the U2 dimension, lending weight to the belief that the U2 dimension distinguishes between large variances in query response times.

Figure 9:
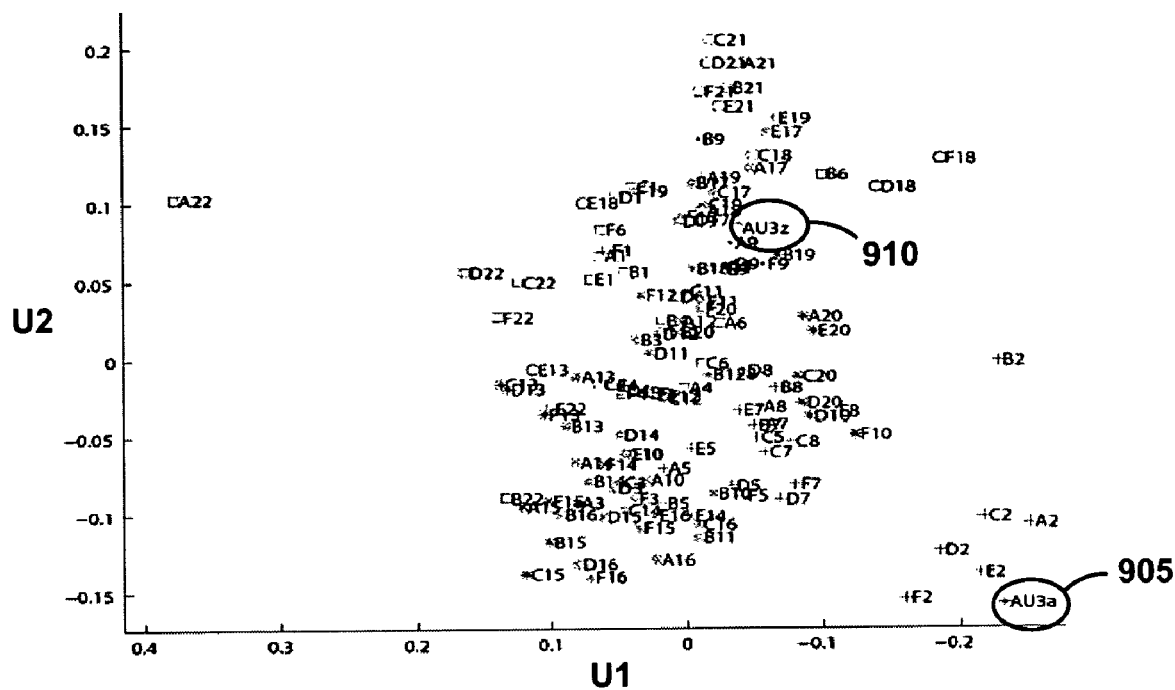
FIG. 9 is a graph illustrating a classification of artificially generated points in addition to all the points in the graph of FIG. 5, wherein the artificial points are generated based on an intuitive meaning of the new dimension $u_3$ in the characterization by the workload characterization system of FIGS. 1 and 2 for the exemplary workload.

FIG. 9 illustrates a similar analysis for dimension U3; FIG. 8 is the graph of FIG. 5 with artificial points, AU3a, 905, and AU3z, 910, added to help interpret the meaning of the variance in a U3 dimension. Both points appear at or near the extreme ends of the U3 dimension, lending weight to the belief that the U3 dimension further distinguishes between queries that are sequential-I/O intensive and random-I/O intensive.

It is to be understood that the specific embodiments of the invention that have been described are merely illustrative of certain applications of the principle of the present invention. Numerous modifications may be made to a system, service, and method for characterizing a business intelligence workload for sizing a new database system hardware configuration described herein without departing from the spirit and scope of the present invention. Moreover, while the present invention is described for illustration purpose only in relation to users connected through a network, it should be clear that the invention is applicable as well to, for example, to local users.

Furthermore, while the present invention is described for illustration purposes only in relation to a business intelligence workload, it should be clear that the invention is applicable as well to, for example, workloads for any type of database system or any other computational system using queries. Furthermore, while system 10 is described in terms of a benchmark for queries of a business intelligence workload, it should be clear that system 10 operate on any set of data requiring characterization.

What is claimed is:

1. A method of characterizing a query workload for sizing a new database system hardware configuration, comprising:
    selecting parameters to describe an exemplary query workload comprised of a collection of queries;
    collecting a plurality of data from execution of the exemplary query workload on multiple system configurations;
    normalizing the collected data;
    partitioning the collection of queries in the exemplary query workload into a plurality of clusters representing classes of the queries, based on the normalized data, so that queries within a cluster are similar to each other, but are dissimilar to queries in other clusters; and
    interpreting the clusters so that the exemplary query workload is described in terms that facilitate characterizing the query workload for sizing a new database system hardware configuration.

2. The method according to claim 1, further comprising defining overall characteristics of the clusters and generating a high-level description of the exemplary query workload that are used in sizing the hardware configuration.

3. The method according to claim 1, wherein identifying the exemplary query workload comprises using an industry benchmark to serve as the exemplary workload that forms a basis for the characterization of the query workload.

4. The method according to claim 3, wherein using the industry benchmark comprises using a TPC-H benchmark.

5. The method according to claim 1, wherein selecting the parameters comprises selecting performance-oriented parameters to monitor during the execution of the query workload.

6. The method according to claim 5, wherein the performance-oriented parameters comprise any one or more of: response time, average processor (CPU) utilization, sequential Input/Output (I/O) throughput rate, random I/O operations rate, size of the largest n-way table join, memory utilization, and network utilization.

7. The method according to claim 3, wherein using the exemplary query workload comprises running the query workload on multiple balanced system configurations.

8. The method according to claim 1, wherein collecting the data comprises sampling the data at a predetermined frequency.

9. The method according to claim 1, wherein normalizing the data comprises ensuring that the data is unit-independent.

10. The method according to claim 9, wherein normalizing the data comprises using z-scores for transforming the data into a dataset with a mean of zero and standard deviation of one.

11. The method according to claim 1, wherein partitioning the data into a plurality of clusters comprises using any one or more of: singular value decomposition or semi-discrete decomposition.

12. The method according to claim 1, wherein the query workload comprises a business intelligence workload.

13. A computer program product including a plurality of executable instruction codes that are stored on a storage medium, for characterizing a query workload for sizing a new database system hardware configuration, comprising:
    a first set of instruction codes for selecting parameters to describe an exemplary query workload comprised of a collection of queries;
    a second set of instruction codes for collecting a plurality of data from execution of the exemplary query workload on multiple system configurations;
    a third set of instruction codes for normalizing the collected data;
    a fourth set of instruction codes for partitioning the collection of queries in the exemplary query workload into a plurality of clusters representing classes of the queries, based on the normalized data, so that queries within a cluster are similar to each other, but are dissimilar to queries in other clusters; and
    a fifth set of instruction codes to assist in interpreting the clusters so that the exemplary query workload is described in terms that facilitate characterizing the query workload for sizing a new database system hardware configuration.

14. The computer program product according to claim 13, further comprising a sixth set of instruction codes for assisting a user in defining overall characteristics of the clusters, and for in generating a high-level description of the exemplary query workload that are used in sizing the hardware configuration.

15. The computer program product according to claim 13, wherein the first set of instruction codes identifies the exemplary query workload comprises by using an industry benchmark to serve as the exemplary workload that forms a basis for the characterization of the query workload.

16. The computer program product according to claim 15, wherein the first set of instruction codes uses a TPC-H benchmark.

17. A system characterizing a query workload for sizing a new database system hardware configuration, comprising:
    a computer;
    a parameter identification module, executed by the computer, for selecting parameters to describe an exemplary query workload comprised of a collection of queries;
    a data collection module, executed by the computer, for collecting a plurality of data from execution of the exemplary query workload on multiple system configurations;
    a normalization module, executed by the computer, for normalizing the collected data;
    a partitioning module, executed by the computer, for partitioning the collection of queries in the exemplary query workload into a plurality of clusters representing classes of the queries, based on the normalized data, so that queries within a cluster are similar to each other, but are dissimilar to queries in other clusters; and
    an identification module, executed by the computer, to assist in interpreting the clusters so that the exemplary query workload is described in terms that facilitate characterizing the query workload for sizing a new database system hardware configuration.

18. The system according to claim 17, further comprising a component identification module for identifying the exemplary query workload.

19. The system according to claim 17, wherein the identification module further assists a user in defining overall characteristics of the clusters, and in generating a high-level description of the exemplary query workload that are used in sizing the hardware configuration.

20. The system according to claim 17, wherein the identification module identifies the exemplary query workload by using a TPC-H benchmark.

* * * * *